Dec. 14, 1926.
A. P. BRUSH
1,610,421
METHOD AND APPARATUS FOR VAPORIZING FUEL FOR INTERNAL COMBUSTION ENGINES
Filed April 2, 1919    3 Sheets-Sheet 1
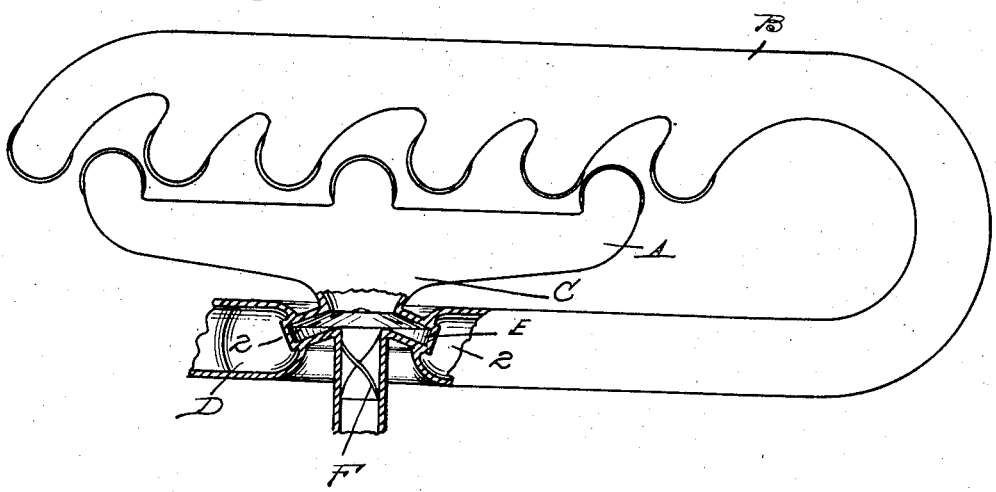
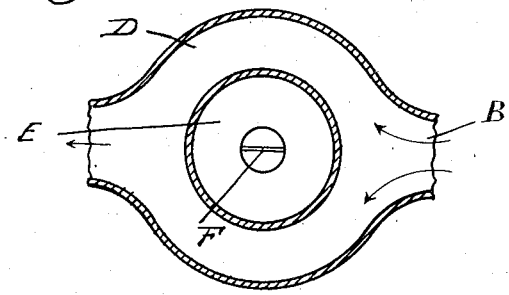
Inventor
Alanson P. Brush
By Whittemore Hulbert & Whittemore
Attorneys

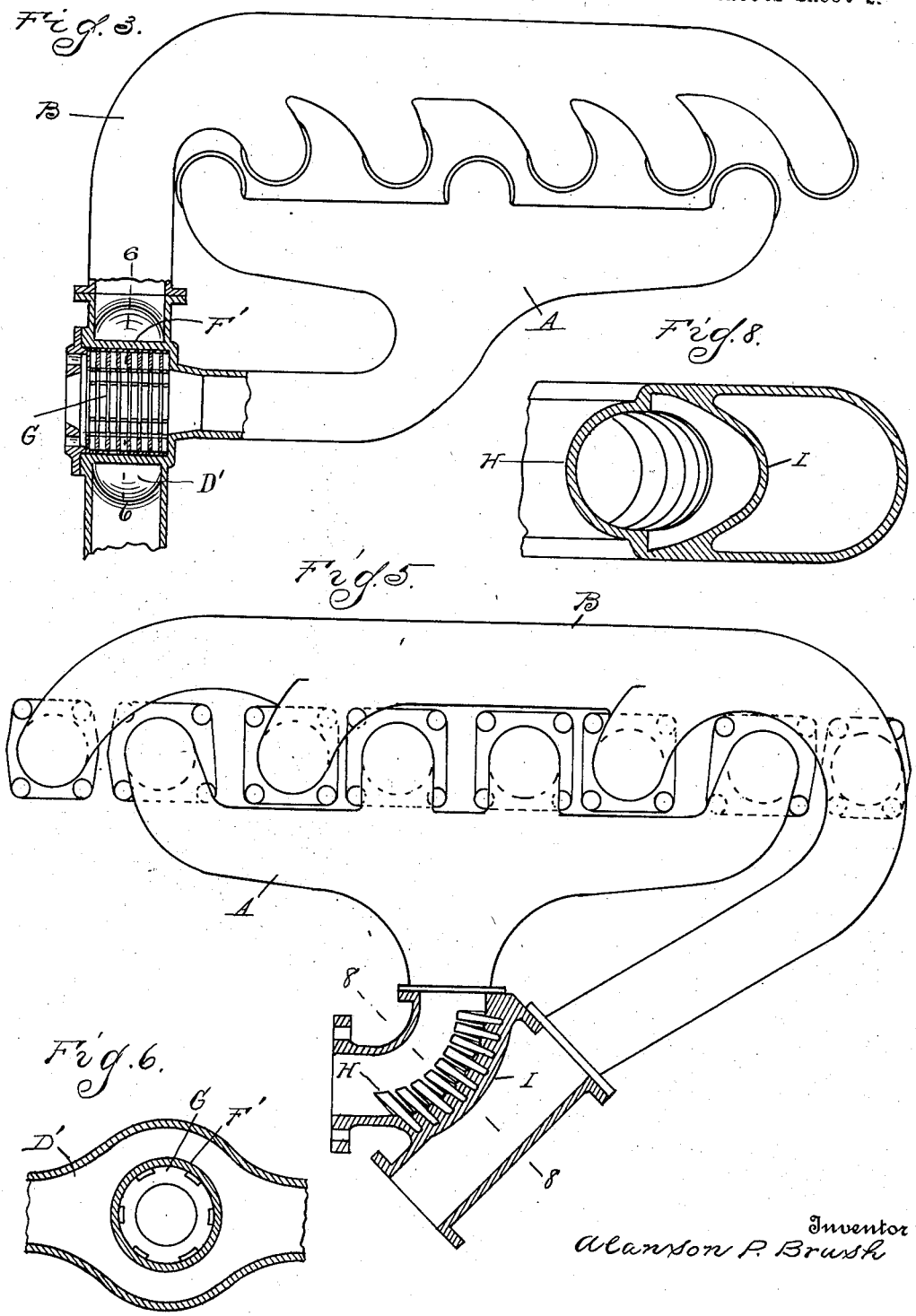

Dec. 14, 1926.

A. P. BRUSH 1,610,421

METHOD AND APPARATUS FOR VAPORIZING FUEL FOR INTERNAL COMBUSTION ENGINES

Filed April 2, 1919  3 Sheets-Sheet 3

Inventor
Alanson P. Brush

By Whittemore Hulbert & Whittemore
Attorneys

Patented Dec. 14, 1926.

1,610,421

UNITED STATES PATENT OFFICE.

ALANSON P. BRUSH, OF DETROIT, MICHIGAN.

METHOD AND APPARATUS FOR VAPORIZING FUEL FOR INTERNAL-COMBUSTION ENGINES.

Application filed April 2, 1919. Serial No. 287,045.

The invention relates to the forming of homogeneous combustible mixtures for internal combustion engines using liquid fuel, and consists in the method and apparatus as hereinafter set forth.

In the present state of the art it is well known that a better explosive mixture is formed where the liquid fuel is heated, particularly when the engine is operating in cold weather. It is also known that the relatively homogeneous mixture formed in the carburetor has a tendency to separate in passing through the intake, portions of the liquid content carried in suspension being thrown out and collecting on the walls of the conduit when cold. To prevent this result and to heat or vaporize the liquid, portions of the conduit walls have been heated, but the results obtained by this method have not been altogether satisfactory. Thus the heated wall will communicate its heat to the entire mixture expanding the same and resulting in loss in power, pre-ignition and other objections. Also, if the temperature of the heated wall is above the vaporizing point of the liquid, the liquid particles will not collect upon this wall and therefore derive little heat therefrom.

It is the object of the present invention to heat the liquid fuel without over-heating the mixture and this is accomplished, first, by separating out and arresting the movement of a portion of the liquid content, and second, by vaporizing the arrested fuel by means out of direct heat conducting contact with the mixture stream.

In the drawings:

Figure 1 is a sectional elevation of the inlet manifold of an internal combustion engine showing one form of the invention;

Figure 2 is a cross-section on line 2—2 Fig. 1;

Figures 3, 4 and 5 are views similar to Figure 1 showing modified constructions;

Figures 6, 7 and 8 are sections similar to Figure 2 on lines corresponding in number to the figures.

In detail, A is the intake manifold of an internal combustion engine and B is the exhaust manifold thereof. C is the common inlet portion of the intake manifold into which the mixture is first introduced from the carbureter. D is a heating chamber connected with or forming a portion of the exhaust of the manifold, which chamber is arranged adjacent to the portion C of the intake manifold and which furnishes the requisite heat for warming or vaporizing the liquid fuel.

In the construction shown in Figure 1, the portion C of the intake manifold is formed with an annular pocket E inclining slightly downward toward the periphery and the diameter of the conduit between the pocket and the carburetor is less than the diameter of the conduit on the other side of the pocket. Also there is preferably placed in the portion of smaller diameter a spiral fin F for inducing a whirling movement of the mixture whereby in passing said pocket E, the larger particles of liquid fuel carried in suspension will be centrifugally thrown into said pocket. The chamber D of the exhaust conduit surrounds and is preferably integral with the pocket E so that the peripheral wall of said pocket will be heated. Thus when the mixture is drawn in, any of the liquid fuel which may drop out of the mixture and collect on the walls of the manifold will drain into the pocket E where the heat will vaporize the same, the vapor passing again into the air current.

In the construction shown in Figure 3, in place of a single pocket a series of pockets is formed by placing in an enlargement F' of the intake manifold a series of annular fins G, while the portion F' is surrounded by a portion D' of the exhaust conduit.

Figure 4 shows a similar construction with the exception that in the latter figure the series of pockets G surrounds a vertical portion of the inlet conduit and the fins are inclined downward toward the periphery, similar to the construction shown in Figure 1.

In Figure 5 the pockets are formed in the peripheral wall of a bend in the intake conduit, as shown at H, this wall being integral with the portion I of the exhaust conduit so as to receive the heat therefrom. The pockets H are also slightly inclined downward toward their inner ends.

With all of the various modifications the effect generally produced is the same, viz, the air current of explosive mixture as a whole is kept out of contact with the heated surface while the liquid carried in suspension and which drops out will enter the pockets into contact with the heated surface. In other words, the effect is the same as passing the explosive mixture through a conduit having cold walls, with provision for vaporizing the liquid fuel collecting on said walls. It will also be noted that the heat being communicated only to the peripheral wall of the pocket will be absorbed by the vaporization of the liquid, so that with the proper amount of heating surface the fins or divisions between the pockets will not usually acquire any higher temperature than the boiling point of the liquid. Consequently the temperature of the explosive mixture will not be materially raised, while a good mixture of the same with the vapor of the liquid fuel is obtained.

The construction shown in Figure 5 has the further feature of utilizing centrifugal force for throwing the liquid particles into the pockets, while the main current of the explosive mixture will turn inside the edges of the fins or divisions between said pockets.

What I claim as my invention is:—

1. The method of operating internal combustion engines comprising the separation of a portion of the liquid fuel content of an indrawn stream of mixed air and fuel, collecting the liquid fuel in a pocket out of the path of the gaseous stream but in contact therewith, vaporizing the collected fuel and reintroducing the vapor into the stream substantially at the point of separation.

2. The method of operating internal combustion engines comprising the arresting of a portion of the liquid fuel content of an indrawn stream of mixed air and fuel, trapping the arrested fuel in a pocket out of the path of the gaseous stream vaporizing the trapped fuel and removing the vapor as generated and reintroducing the same into the stream substantially at the point of arrest.

3. The method of operating internal combustion engines comprising changing the direction of the indrawn stream of mixed air and liquid fuel to separate from said stream, by inertia, a portion of the liquid content, collecting the separated liquid out of the path of the gaseous stream, vaporizing the liquid fuel, removing the vapor as generated to reduce the vapor pressure on the fuel and reintroducing the vapor into the stream substantially at the point of collection.

4. The method of operating internal combustion engines comprising the arresting of a portion of the liquid fuel content of an indrawn stream of mixed air and fuel in a pocket out of the path of but in contact with the gaseous stream, heating the arrested fuel to vaporize the liquid and reintroducing the vapor into the stream substantially at the point of arrest and thereby removing the vapor pressure from the fuel to facilitate its vaporization.

5. The method of operating internal combustion engines comprising the separation of the heavier particles of fuel from the main current of explosive mixture, collecting the separated fuel by draining the same into a pocket out of the path of the gaseous stream but in contact therewith and heating the liquid fuel in said pocket while isolated from the main current to reintroduce the vapor into said current and to remove the vapor pressure from the remaining liquid fuel.

6. The combination with a fuel mixture induction conduit for internal combustion engines, of a pocket formed in a wall of said conduit, having an open end communicating with said stream, said pocket being arranged to exclude the main current of explosive mixture while permitting the liquid portion of said mixture to be collected therein, and means for heating said pocket whereby the fuel collected in said pocket through said open end is vaporized and returned through the main stream through the same open end.

7. The combination with a fuel mixture induction conduit of an internal combustion engine, of a series of pockets arranged in a wall of said conduit, each having an open end communicating with said stream, for receiving the liquid falling out of suspension, said pockets being arranged to exclude the main current of explosive mixture, and means for heating said pockets whereby the fuel collected in each pocket is vaporized and returned to the stream through the same open end through which it entered the pocket.

8. The combination with a fuel mixture induction conduit of an internal combustion engine, of a series of pockets extending transversely of said conduit for receiving the liquid falling out of suspension, each of said pockets being arranged to exclude the gaseous stream and having an open end in contact with said stream, and means for heating said pockets.

9. The combination with a fuel mixture induction conduit of an internal combustion engine, of a series of pockets formed by transversely extending spaced fins projecting inward from the wall of said conduit and arranged to exclude the gaseous portion of the mixture passing through said conduit, and means for heating the portion of the wall from which said fins project.

10. The combination with a fuel mixture induction conduit, of means for separating and arresting a portion of the liquid content of the stream of explosive mixture passing through said conduit, means for collecting said liquid fuel out of the path of said stream but in contact therewith, and means for vaporizing the collected liquid and reintroducing the vapor into the stream substantially at the point of arrest.

11. The combination with a fuel mixture induction conduit of an internal combustion engine, of a bent portion of said conduit having a series of transversely extending inwardly projecting fins on the peripheral wall of the bend forming a series of pockets protected from the gaseous stream by said fins, and means for heating said peripheral wall.

12. The combination with a fuel mixture conduit for internal combustion engines, of a pocket formed in a wall of said conduit having an open end communicating with said stream through which liquid fuel falling out of suspension is received into said pocket, said pocket being arranged to retain the liquid fuel therein by gravity, and to exclude the main current of explosive mixture, and means for heating said pocket whereby the collected fuel is vaporized and returned to the stream through said open end.

13. The combination with a fuel mixture induction conduit of an internal combustion engine, of means for heating a portion of said conduit to form a hot spot of limited area to avoid materially heating the gaseous portion of the stream, and a pocket in said hot spot for retaining by gravity the liquid fuel therein until vaporized while permitting the instant removal of vapor as generated.

In testimony whereof I affix my signature.

ALANSON P. BRUSH.